(12) United States Patent
Imanishi et al.

(10) Patent No.: US 9,225,028 B2
(45) Date of Patent: Dec. 29, 2015

(54) FUEL CELL SYSTEM

(75) Inventors: Hiroyuki Imanishi, Toyota (JP); Kota Manabe, Toyota (JP); Tomoya Ogawa, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 643 days.

(21) Appl. No.: 12/810,127

(22) PCT Filed: Dec. 18, 2008

(86) PCT No.: PCT/JP2008/073053
§ 371 (c)(1),
(2), (4) Date: Jun. 22, 2010

(87) PCT Pub. No.: WO2009/084447
PCT Pub. Date: Jul. 9, 2009

(65) Prior Publication Data
US 2010/0273075 A1  Oct. 28, 2010

(30) Foreign Application Priority Data
Dec. 27, 2007  (JP) ................. 2007-337843

(51) Int. Cl.
*H01M 8/04* (2006.01)
*H01M 8/10* (2006.01)

(52) U.S. Cl.
CPC .......... *H01M 8/0432* (2013.01); *H01M 8/0488* (2013.01); *H01M 8/0491* (2013.01);
(Continued)

(58) Field of Classification Search
CPC .......... H01M 8/0432; H01M 8/04388; H01M 8/0488; H01M 8/04358; H01M 8/04335; H01M 8/044559; H01M 8/0491; H01M 8/04268; H01M 8/04395; H01M 8/04589; H01M 2008/1095; Y02E 60/50; Y02T 90/30
USPC .......... 429/432, 428, 400, 430; 700/296, 266, 700/67, 1, 298, 297, 286; 702/182, 127, 85, 702/57, 64; 701/36
See application file for complete search history.

(56) References Cited

U.S. PATENT DOCUMENTS 5,918,246 A * 6/1999 Goodnow et al. ............. 711/137
2002/0114986 A1* 8/2002 Aoyagi et al. ................. 429/23
(Continued)

FOREIGN PATENT DOCUMENTS

JP   7-272736 A     10/1995
JP   2003-504807 A   2/2003
(Continued)

*Primary Examiner* — Patrick Ryan
*Assistant Examiner* — Aaron Greso
(74) *Attorney, Agent, or Firm* — Kenyon & Kenyon LLP

(57) ABSTRACT

A fuel cell system capable of carrying out a proper current limiting even when decreasing a cell voltage through, e.g., a rapid warm-up is provided. When a rapid warm-up is started, an acceptable cell-voltage value setting part sets a acceptable lowest-cell-voltage value in accordance with the operation state of a fuel cell. Meanwhile, a target cell-voltage value setting part sets an initial value for a target lowest-cell-voltage value. The target cell-voltage value setting part then compares a lowest cell voltage detected by a cell monitor with the set target lowest-cell-voltage value, and judges whether or not the lowest cell voltage is near the target lowest-cell-voltage value continuously for a given time period. If the result of the judgment is positive, the target cell-voltage value setting part updates the target lowest-cell-voltage value with a value obtained by decreasing the target lowest-cell-voltage value only by an update width.

3 Claims, 5 Drawing Sheets

(52) U.S. Cl.
CPC ...... *H01M8/04268* (2013.01); *H01M 8/04335* (2013.01); *H01M 8/04358* (2013.01); *H01M 8/04388* (2013.01); *H01M 8/04395* (2013.01); *H01M 8/04559* (2013.01); *H01M 8/04589* (2013.01); *H01M 2008/1095* (2013.01); *H01M 2250/20* (2013.01); *Y02E 60/50* (2013.01); *Y02T 90/32* (2013.01)

(56) References Cited

U.S. PATENT DOCUMENTS

2005/0142396 A1* 6/2005 Igarashi et al. ............... 429/12

2007/0166584 A1* 7/2007 Kurosawa ..................... 429/22

FOREIGN PATENT DOCUMENTS

| JP | 2003-187842 A | 7/2003 | | |
|----|---------------|--------|---|---|
| JP | 2004-172055 A | 6/2004 | | |
| JP | 2005-183126 A | 7/2005 | | |
| JP | 2005-197008 A | 7/2005 | | |
| JP | 2006-309979 A | 11/2006 | | |
| JP | 2007-95588 A | 4/2007 | | |
| WO | WO 2005/011038 | * | 2/2005 | ............. H01M 8/04 |

* cited by examiner

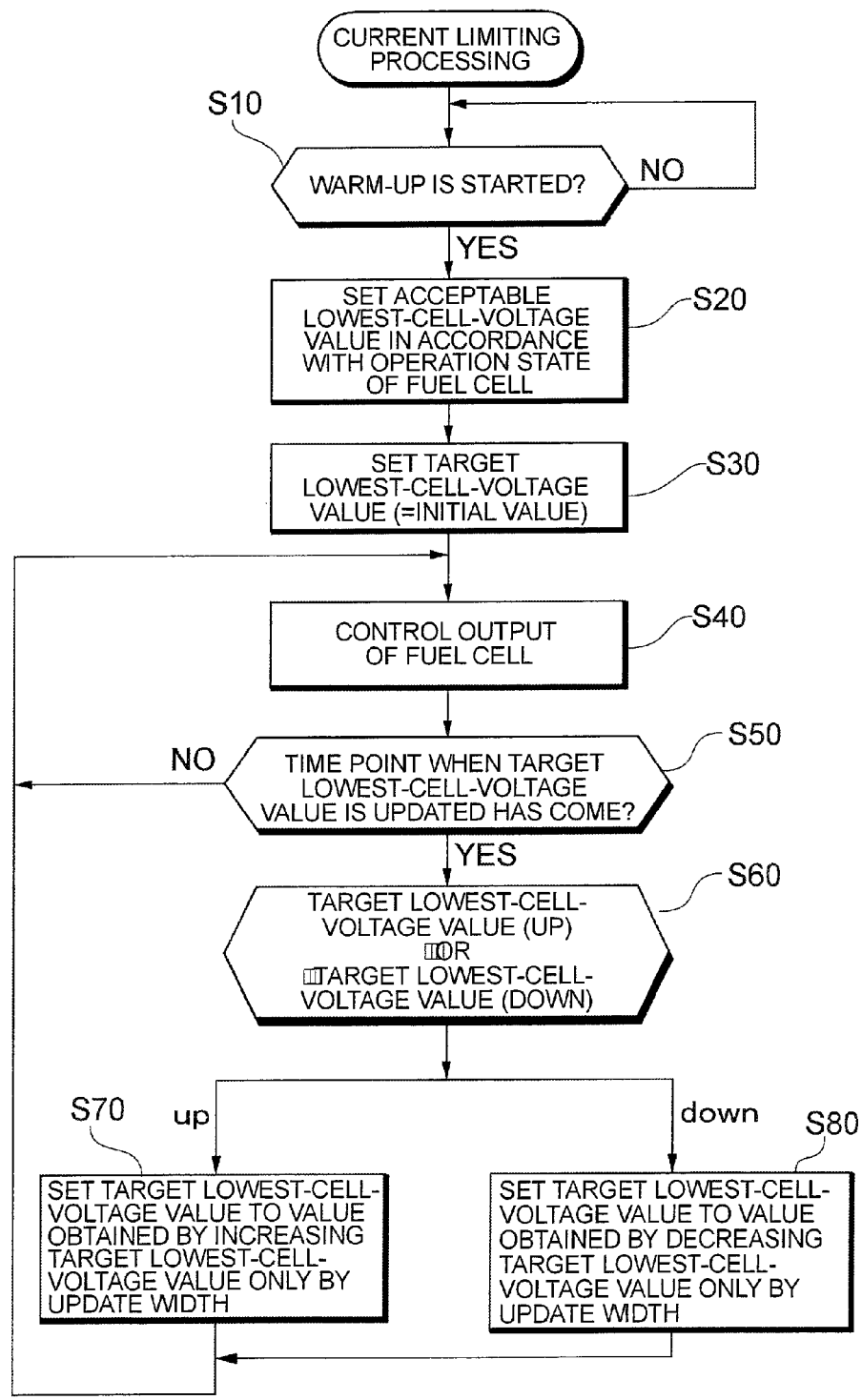

FUEL CELL SYSTEM

This is a 371 national phase application of PCT/JP2008/073053 filed 18 Dec. 2008, which claims priority to Japanese Patent Application No. 2007-337843 filed 27 Dec. 2007, the contents of which are incorporated herein by reference.

TECHNICAL FIELD

The present invention relates to a fuel cell system provided with a fuel cell having a plurality of cells.

BACKGROUND ART

Among fuel cells for generating electric power utilizing an electrochemical reaction between hydrogen and oxygen, polymer electrolyte fuel cells are commonly known. The polymer electrolyte fuel cell includes a stack which is constituted from a plurality of stacked cells. The cells constituting the stack each include an anode (fuel electrode) and a cathode (air electrode), and a solid polymer electrolyte membrane having a sulfonic acid group as an ion exchange group is interposed between each anode and cathode.

A fuel gas containing a fuel gas (hydrogen-enriched reformed hydrogen obtained by reforming hydrogen gas or hydrocarbon) is supplied to the anode, while a gas containing oxygen as an oxidant (oxidant gas), e.g., air, is supplied to the cathode. Upon the supply of the fuel gas to the anode, hydrogen contained in the fuel gas reacts with a catalyst in a catalyst layer which constitutes the anode, thereby generating hydrogen ions. The generated hydrogen ions pass through the solid polymer electrolyte membrane and electrically react with oxygen in the cathode. Electric power is thus generated through the electrochemical reaction.

Here, Patent Document 1 below discloses a technique in which a fuel cell is started with a short supply of at least one of a fuel gas supplied to an anode and an oxidant gas supplied to a cathode, so that overvoltage in a part of the electrodes will increase and more heat will be generated, thereby increasing the temperature of the fuel cell.

Patent Document 1: JP2003-504807 T

DISCLOSURE OF THE INVENTION

Problem to be Solved by the Invention

Although a cell voltage of a fuel cell needs to be decreased to a preset threshold (acceptable value) when carrying out a rapid warm-up, in the related art, a current has not been limited before a cell voltage falls below an acceptable value. However, carrying out a current limiting after the cell voltage falls below an acceptable value has lead to a problem in that the cell voltage falls significantly below the acceptable value due to a rapid decline of the cell voltage during a rapid warm-up, leading to an insufficiency of that current limiting.

The present invention has been made in light of the above circumstances, and an object of the invention is to provide a fuel cell system capable of carrying out a proper current limiting even when decreasing a cell voltage through, e.g., a rapid warm-up.

Means for Solving the Problem

In order to solve the problem described above, the present invention provides a fuel gas system including: a fuel cell having a plurality of cells; a detection unit that detects a cell voltage; a setting unit that sets a target lowest voltage for the cell voltage; and a control unit that carries out a current limiting for the fuel cell when the detected cell voltage reaches the target lowest voltage, in which, when the relationship between the detected cell voltage and the target lowest voltage satisfies a predetermined condition, the setting unit updates the target lowest voltage in a stepwise manner.

With such a configuration, when the relationship between the detected cell voltage and the target lowest voltage satisfies a predetermined condition (e.g., when the cell voltage is near the target lowest voltage continuously for a given time period, or when the cell voltage is not near the target lowest voltage and is higher than the target lowest voltage continuously for a given time period), the target lowest voltage is updated in a stepwise manner. The target lowest-cell-voltage value that is updated as above is used when carrying out a current limiting, and therefore, this can prevent a problem in that: the cell voltage and the target lowest voltage are very different from each other; and as a result, the cell voltage is out of control, leading to the cell voltage falling significantly below the target lowest voltage.

In the configuration above, it is preferable that the setting unit sets the target lowest voltage for the cell voltage to a value higher than a lowest acceptable value for the cell voltage.

Further, in the configuration above, it is preferable that, when the detected cell voltage falls within a threshold range of the target lowest voltage, and this state continues for or more than a predetermined time period, the setting unit decreases the target lowest voltage as of the present moment.

Further, in the configuration above, it is preferable that, when the detected cell voltage falls within a threshold range of the target lowest voltage predetermined number of times or more, the setting unit decreases the target lowest voltage.

Further, in the configuration above, it is preferable that, when the detected cell voltage exceeds a value obtained by adding an update margin to the target lowest voltage, and this state continues for or more than a predetermined time period, the setting unit increases the target lowest voltage as of the present moment.

Further, in the configuration above, it is preferable that, when the detected cell voltage exceeds a value obtained by adding an update margin to the target lowest voltage a predetermined number of times or more, the setting unit increases the target lowest voltage.

Further, in the configuration above, it is preferable that an acceptable value setting unit that sets the lowest acceptable value for the cell voltage based on an operation state of the fuel cell is further provided.

Further, in the configuration above, it is preferable that the operation state of the fuel cell indicates any of a related temperature of the fuel cell, an output current of the fuel cell, and a state of supply of a reaction gas with respect to the fuel cell.

The present invention provides another fuel cell system including: a fuel cell having a plurality of cells; a detection unit that detects a cell voltage; a setting unit that sets a target lowest voltage for the cell voltage; and a control unit that carries out a current limiting for the fuel cell when the detected cell voltage reaches the target lowest voltage, in which, when a command value for an output current with respect to the fuel cell is set to a lower limit value of the output current for or more than a predetermined time period while the control unit is carrying out the current limiting, the setting unit updates the target lowest voltage as of the present moment with an actual cell voltage detected by the detection unit.

Effect of the Invention

According to the present invention, a proper current limiting can be carried out even when a rapid decline of a cell voltage, or the like occurs.

BEST MODE FOR CARRYING OUT THE INVENTION

A. Embodiment

FIG. 1 schematically shows the configuration of a vehicle equipped with a fuel cell system 10 according to an embodiment. Although the following description assumes a fuel cell hybrid vehicle (FCHV) as an example of vehicles, the fuel cell system may also be applied to electric vehicles and hybrid vehicles. In addition, the fuel cell system may be applied not only to the vehicles but also to various mobile objects (e.g., ships, airplanes and robots), stationary power supplies and mobile fuel cell systems.

In FIG. 1, the fuel cell system 10 includes: a fuel gas supply system 4 for supplying a fuel gas containing hydrogen to a fuel cell 20; an oxidant gas supply system 7 for supplying an oxidant gas containing air to the fuel cell 20; a coolant supply system 3 for cooling the fuel cell 20; and a power system 9 for charging and discharging power generated from the fuel cell 20.

The fuel cell 20 includes a membrane-electrode assembly (MEA) 24 which has been prepared by forming an anode 22 and a cathode 23 by, for example, screen printing, on respective sides of a polymer electrolyte membrane 21 constituted from a proton-conducting ion-exchange membrane made of, for example, a fluororesin. Both sides of the membrane-electrolyte assembly 24 are sandwiched by separators (not shown) each having flow paths for the fuel gas, oxidant gas and coolant, and a grooved anode gas channel 25 and a grooved cathode gas channel 26 are formed respectively between the separator and the anode 22 as well as between the separator and the cathode 23. The anode 22 is provided with a fuel-electrode catalyst layer provided on a porous support layer, while the cathode 23 is provided with an air-electrode catalyst layer provided on a porous support layer. The catalyst layers of these electrodes are formed with, for example, platinum particles adhering thereto.

The oxidization reaction represented as formula (1) below occurs at the anode 22, and the reduction reaction represented as formula (2) below occurs at the cathode 23. The electromotive reaction represented as formula (3) below occurs in the entire fuel cell 20.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

Note that although a structure of a unit cell including the membrane-electrode assembly 24, the anode gas channel 25 and the cathode gas channel 26 is schematically shown in FIG. 1 for convenience of explanation, the fuel cell actually includes a stack structure having a plurality of unit cells (cell group) which are connected in series via the above-described separators.

The coolant supply system 3 of the fuel cell system 10 is provided with a cooling path 31 for circulating coolant, a temperature sensor 32 for detecting the temperature of the coolant drained from the fuel cell 20, a radiator (heat exchanger) 33 for radiating the heat of the coolant to the outside, a valve 34 for adjusting an amount of the coolant to be introduced into the radiator 33, a coolant pump 35 for pressurizing and circulating the coolant, a temperature sensor 36 for detecting the temperature of the coolant to be supplied to the fuel cell 20, and the like.

Arranged in the fuel gas supply system 4 of the fuel cell system 10 are: a fuel gas supply device 42 for storing a fuel gas (anode gas), e.g., a hydrogen gas; a fuel gas flow path 40 for supplying the fuel gas from the fuel gas supply device 42 to the anode gas channel 25; and a circulation flow path (circulation path) 51 for circulating a fuel-off gas exhausted from the anode gas channel 25 to the fuel gas flow path 40, these gas flow paths constituting the fuel gas circulation system.

The fuel gas supply device 42 is constituted by, for example, a high-pressure hydrogen tank, a hydrogen-absorbing alloy and a reformer. The fuel gas flow path 40 is provided with: a cutoff valve (main valve) 43 for controlling the fuel gas outflow from the fuel gas supply device 42; a pressure sensor 44 for detecting the pressure of the fuel gas; a regulating valve (ejector) 45 for regulating the fuel gas pressure of the circulation path 51; and a cutoff valve 46 for controlling the fuel gas supply to the fuel cell 20.

The circulation flow path 51 is provided with: a cutoff valve 52 for controlling the fuel-off gas supply from the fuel cell 20 to the circulation flow path 51; a gas-liquid separator 53 and a discharge valve 54 for removing water contained in the fuel-off gas; a hydrogen pump (circulation pump) 55 for compressing the fuel-off gas, which has lost some pressure while passing through the anode gas channel 25, so as to increase the gas pressure to a suitable pressure and return the fuel-off gas to the fuel gas flow path 40; and a check valve 56 for preventing the fuel gas in the fuel gas flow path 40 from flowing back toward the circulation flow path 51. By driving the hydrogen pump 55 with a motor, the fuel-off gas resulting from the drive of the hydrogen pump 55 is joined in the fuel gas flow path 40 with the fuel gas supplied from the fuel gas supply device 42 and then supplied to and reused in the fuel cell 20. Note that the hydrogen pump 55 is provided with: a revolution speed sensor 57 for detecting the revolution speed of the hydrogen pump 55; and pressure sensors 58 and 59 for detecting the pressures of the circulation path before and behind the hydrogen pump 55.

Also, in the circulation flow path 51, an exhaust flow path 61 for exhausting the fuel-off gas, which has been exhausted from the fuel cell 20, to the outside of a vehicle via a diluter (e.g., a hydrogen-concentration lowering device) 62 is arranged in such a manner that the exhaust flow path 61 branches from the circulation flow path 51. The exhaust flow path 61 is provided with a purge valve 63 and configured to be capable of controlling the exhaust of the fuel-off gas. By opening or closing the purge valve 63 to repeat circulation in the fuel cell 20, the exhaust flow path 61 can exhaust the fuel-off gas, in which the concentration of impurities has been increased, to the outside, and introduce fresh fuel gas, thereby preventing the cell voltage from decreasing. In addition, the exhaust flow path 61 can generate a pulse in the internal pressure of the circulation flow path 51 and remove water which has accumulated in the gas flow path.

Meanwhile, in the oxidant gas supply system 7 of the fuel cell system 10, an oxidant-gas flow path 71 for supplying an oxidant gas (cathode gas) to the cathode gas channel 26 and a cathode-off gas flow path 72 for exhausting the cathode-off gas exhausted from the cathode gas channel 26 are arranged. The oxidant gas flow path 71 is provided with: an air cleaner 74 for introducing air from the atmosphere; and an air compressor 75 for compressing the introduced air and sending the compressed air to the cathode gas channel 26 as an oxidant gas. The air compressor 75 is provided with a pressure sensor 73 for detecting the air supply pressure of the air compressor 75. A humidifier 76 for performing moisture exchange is provided between the oxidant gas flow path 71 and the cathode-off gas flow path 72. The cathode-off gas flow path 72 is provided with a pressure-regulating valve 77 for regulating the exhaust pressure of the cathode-off gas flow path 72, a gas-liquid separator 64 for removing water contained in the cathode-off gas, and a muffler 65 for absorbing exhaust noise of the cathode-off gas. The cathode-off gas exhausted from the gas-liquid separator 64 is branched, and a part of the branched cathode-off gas flows into the diluter 62 and is mixed with the fuel-off gas held in the diluter 62 to be diluted, while the other part of the branched cathode-off gas is absorbed by the muffler 65, mixed with the gas which has been mixed and diluted by the diluter 62, and then exhausted to the outside of the vehicle.

The power system 9 in the fuel cell system 10 is connected to: a DC-DC converter 90, to which an output terminal of a battery 91 is connected on a primary side and an output terminal of the fuel cell 20 is connected on a secondary side; the battery 91 for storing surplus power as a secondary battery; a battery computer 92 for monitoring the state of charge of the battery 91; an inverter 93 for supplying an AC power to a vehicle-drive motor 94 which serves as a load of or a target to be driven by the fuel cell 20; an inverter 95 for supplying an AC power to various high-voltage auxiliary apparatuses 96 in the fuel cell system 10; a voltage sensor 97 for measuring an output voltage of the fuel cell 20; and a current sensor 98 for measuring an output current.

In addition, the fuel cell 20 is connected to a cell monitor 101 for detecting a voltage in each cell of the fuel cell 20. The cell monitor (detection unit) 101 is configured to detect the cell voltage of each cell and further detect the lowest cell voltage, being the cell voltage which has the lowest value of the cell voltages.

The DC-DC converter 90 performs voltage conversion with respect to surplus power of the fuel cell 20 or a regenerative power resulting from a braking operation for the vehicle-drive motor 94 and supplies the power to the battery 91 to charge the battery 91. Also, in order to compensate for the shortage of power generated by the fuel cell 20 with respect to the power that the vehicle-drive motor 94 requires, the DC-DC converter 90 performs voltage conversion with respect to a discharge power from the battery 91 and outputs the power to the secondary side.

The inverters 93 and 95 convert a direct current to a three-phase alternating current and output the converted current respectively to the vehicle-drive motor 94 and the high-voltage auxiliary apparatus 96. The vehicle-drive motor 94 is provided with a revolution speed sensor 99 for detecting the revolution speed of the motor 94. The motor 94 is mechanically coupled to wheels 100 via a differential so that the torque of the motor 94 can be converted to a driving power for the vehicle.

The voltage sensor 97 and the current sensor 98 are used for measuring an AC impedance based on the phase and amplitude of a current with respect to the voltage of an AC signal superimposed on the power system 9. The state (water content, power generation state, etc.) of the fuel cell 20 is understood from the measurement result of the AC impedance.

The fuel cell system 10 is further provided with a controller 80 for controlling power generation of the fuel cell 12. The controller 80 is constituted from a general purpose computer that includes, for example, a CPU (Central Processing Unit), a RAM, a ROM and an interface circuit. The controller 80 is configured to: acquire sensor signals from the temperature sensors 32 and 36, the pressure sensors 44, 58 and 59 and the revolution speed sensors 57 and 99 as well as signals from the voltage sensor 97, the current sensor 98 and an ignition switch 82; adjust the revolution speeds of the hydrogen pump 55 and the air compressor 75 by driving the respective motors in accordance with the status of battery operation, e.g., power load; and control various valves to open/close or adjust the degrees of the openings of the valves. In this embodiment, the temperature sensors 32 and 36 are given as examples of the sensors for measuring the temperature of the coolant in the fuel cell 20, but may detect temperatures concerning the fuel cell 20 (hereinafter collectively referred to as stack-related temperature) such as an outside-air temperature in the periphery of the fuel cell and a component temperature.

When controlling the output power of the fuel cell system 10, for example, during a rapid warm-up, the controller 80 computes a vehicle system-request power (system-request power requested by the system) Preq based on a lost power of a vehicle auxiliary apparatus, an amount of charge of the battery and a power limit rate of the high-voltage auxiliary apparatus 96, and computes a vehicle system-request current Ireq by dividing the system-request power Preq by a secondary voltage output from the DC-DC converter 90. At this time, the controller 80 performs current limiting processing based on the lowest cell voltage detected by the cell monitor 101.

In this embodiment, when it is determined that the stack-related temperature falls below a predetermined temperature (e.g., 0° C.) in the state where the operation of the vehicle is stopped (i.e., at a start preparation step before vehicle driving; hereinafter referred to as start preparation state), a low-efficiency operation is started (a shift from a start preparation state to a low-efficiency operation state), thereby carrying out a rapid warm-up of the fuel cell 20.

Here, the low-efficiency operation refers to an operation with a low power generation efficiency which is achieved by reducing the supply of air compared with a normal operation (e.g., setting an air stoichiometry ratio to around 1.0) so as to increase power generation loss. When the low-efficiency operation is carried out with an air stoichiometry ratio being set low, the concentration overvoltage becomes large compared with the normal operation. Therefore, there is an increase in heat loss (power generation loss) of energy that can be obtained through a reaction between hydrogen and oxygen.

The above-described rapid warm-up under the low-efficiency operation is carried out not only before vehicle driving (the start preparation state to the low-efficiency operation state) but also, e.g., during vehicle driving or when the vehicle is stopped (the normal operation state to the low-efficiency operation state). Also, the air stoichiometry ratio (i.e., ratio of excess) during the low-efficiency operation is not intended to be limited to around 1.0, and may be set/changed arbitrarily if that ratio is small compared to the normal operation.

FIG. 2 is a functional block diagram which is realized by the controller 80 executing a predetermined computer program.

As shown in FIG. 2, the controller 80 includes a rapid warm-up determination part 80a, a request power calculation part 80b, an acceptable cell-voltage value setting part 80c, a target cell-voltage value setting part 80d and a current/voltage command value calculation part 80e.

The rapid warm-up determination part 80a determines the start/stop of execution of a rapid warm-up based on the stack-related temperature detected by the temperature sensors 32 and 35. More specifically, when the rapid warm-up determination part 80a detects that the stack-related temperature is below a first threshold temperature (e.g., 0° C.) in a start preparation state, the rapid warm-up determination part 80*a* determines that the execution of a rapid warm-up should be started, and then outputs rapid warm-up start commands to the acceptable cell-voltage value setting part 80*c*, the target cell-voltage value setting part 80*d* and the current/voltage command value calculation part 80*e*. Meanwhile, when the rapid warm-up determination part 80*a* detects that the stack-related temperature is equal to or higher than a second threshold temperature (e.g., 0 to 80° C.) or that a predetermined time period has passed from the start of a rapid warm-up, the rapid warm-up determination part 80*a* outputs a rapid warm-up execution stop command to the current/voltage command value calculation part 80*e*.

The request power calculation part 80*b* calculates a system-request power (here, request power for the fuel cell 12) based on a lost power of a vehicle auxiliary apparatus, an amount of charge of the battery, a power limit rate of the high-voltage auxiliary apparatus 96, etc., and outputs the calculated request power to the current/voltage command value calculation part 80*e*.

The acceptable cell-voltage value setting part (acceptable value setting unit) 80*c* has a function of setting an acceptable lowest-cell-voltage value based on the operation state of the fuel cell 20. The acceptable lowest-cell-voltage value represents a voltage which is allowable, for the purpose of protecting the fuel cell, as a cell voltage during a low temperature (lowest acceptable value of the cell voltage), and is calculated from, e.g., a reversal potential during a hydrogen gas shortage and an amount of reduction in a cathode potential due to a resistance value. The acceptable lowest-cell-voltage value is obtained through experiments, and an acceptable value map for determining the acceptable lowest-cell-voltage value is created based on the experimental results. Various acceptable lowest-cell-voltage values are registered in accordance with the operation state of the fuel cell 20, more specifically, the stack-related temperature, an output current of the fuel cell 20, the state of supply of the fuel gas to the fuel cell 20 (normal or abnormal state of supply of the fuel gas), etc.

The acceptable cell-voltage value setting part 80*c* recognizes the operation state of the fuel cell 20 from the stack-related temperature detected by the temperature sensors 32 and 35, the output current of the fuel cell 20 which is detected by the current sensor 98, a fuel gas flow rate per unit time which is detected by the pressure sensor, a flow meter (not shown), etc., and refers to the acceptable value map so as to set the acceptable lowest-cell-voltage value in accordance with the operation state. The acceptable cell-voltage value setting part 80*c* then notifies the target cell-voltage value setting part 80*d* of the set acceptable lowest-cell-voltage value.

The target cell-voltage value setting part (setting unit) 80*d* has a function of setting a target value for the lowest cell voltage (target lowest voltage), a function of updating a target value for the lowest cell voltage (hereinafter referred to as target lowest-cell-voltage value) in a stepwise manner when a detected cell voltage satisfies a predetermined condition in relation to the target lowest-cell-voltage value, and a function of outputting the updated target lowest-cell-voltage value to the current/voltage command value setting part 80*e*. The updated target lowest-cell-voltage value is always set to a value equal to or higher than the acceptable lowest-cell-voltage value. The target lowest-cell-voltage value is not described any more here because operations concerning the setting and updating of the target lowest-cell-voltage value will be described below in detail.

The current/voltage command value setting part 80*e* outputs a current command value and a voltage command value to the DC-DC converter 90 based on the request power output from the request power calculation part 80*b* and the target lowest-cell-voltage values output from the acceptable cell-voltage value setting part 80*c* and the target cell-voltage value setting part 80*d*. The current command value and voltage command value serve as control signals for specifying an actual output current and output voltage in the fuel cell 20. Also, the current/voltage command value setting part (control unit) 80*e* carries out a current limiting using PI control with respect to the target lowest-cell-voltage value when the detected cell voltage (lowest cell voltage) reaches the target lowest-cell-voltage value.

FIG. 3 is a timing chart explaining operations in conventional current limiting processing. FIG. 4 is a timing chart explaining operations in current limiting processing in this embodiment. In each of FIGS. 3 and 4, the vertical axis indicates a cell voltage of the fuel cell 20 and an output current (vehicle system-request current I0) and an output voltage, and the horizontal axis indicates an elapsed time.

As shown in FIG. 3, in the conventional current limiting processing, only an acceptable lowest-cell-voltage value Vph has been set, while a target lowest-cell-voltage value has not been set. Therefore, a current limiting has not been carried out before the lowest cell voltage reaches the acceptable lowest-cell-voltage value after the start of a rapid warm-up under a low-efficiency operation. However, carrying out a current limiting after the arrival at the acceptable lowest-cell-voltage value has lead to a problem in that the cell voltages falls significantly below the acceptable lowest-cell-voltage value due to a rapid decline of the cell voltage during the low-efficiency operation (see α shown in FIG. 3).

In light of the above, in this embodiment, a target lowest-cell-voltage value Vth is set to be equal to or higher than the acceptable lowest-cell-voltage value Vph, the target lowest-cell-voltage value Vth being updated in a stepwise manner, and a current limiting is carried out using the updated target lowest-cell-voltage value Vth, as shown in FIG. 4. More specifically, a current limiting under PI control is carried out with respect to the updated target lowest-cell-voltage value Vth, thereby preventing the problem of the cell voltage falling significantly below the acceptable lowest-cell-voltage value.

The current limiting processing in this embodiment will be described below in detail with reference to FIG. 4.

When the rapid warm-up determination part 80*a* detects that the stack-related temperature is below the first threshold temperature (e.g., 0° C.) in a start preparation state and outputs a command for starting a rapid warm-up under a low-efficiency operation, the acceptable cell-voltage value setting part 80*c* recognizes the operation state of the fuel cell 20 as of the relevant moment, and sets a acceptable lowest-cell-voltage value Vph in accordance with the operation state by referring to the acceptable value map (see FIG. 4). Meanwhile, the target cell-voltage value setting part 80*d* sets an initial value for a target lowest-cell-voltage value Vth (e.g., −0.05 V) (see FIG. 4). Note that the initial value for the target lowest-cell-voltage value may be a fixed value, but may also be changed as appropriate in accordance with the FC-related temperature, etc.

The current/voltage command value calculation part 80*e* outputs a current command value and a voltage command value to the DC-DC converter 90 so as to decrease the cell voltage of the fuel cell 20 toward the initial value for the target lowest-cell-voltage value Vth. By carrying out such a control, the cell voltage of the fuel cell 20 decreases toward the target lowest-cell-voltage Vth.

Operation for Case of Decreasing Target Lowest-Cell-Voltage Value

The target cell-voltage value setting part 80d compares the lowest cell voltage detected by the cell monitor 101 with the set target lowest-cell-voltage value Vth. The target cell-voltage value setting part 80d then judges whether or not the lowest cell voltage is near the target lowest-cell-voltage value Vth continuously for a given time period (predetermined time period) using conditional expression (1). Note that a threshold voltage Vr (≥0) and a predetermined time period Tr (≥0) may be set/changed arbitrarily.

$$|Vth-Vd| \leq Vr \text{ that continues for or more than the predetermined time period } Tr \quad (1)$$

Vth represents the target lowest-cell-voltage value, Vd represents the lowest cell voltage, and Vr represents the threshold voltage (threshold range).

When the target cell-voltage value setting part 80d determines that conditional expression (1) holds (see β1 shown in FIG. 4), the target cell-voltage value setting part 80d updates the target lowest-cell-voltage value Vth with a value obtained by decreasing the target lowest-cell-voltage value Vth only by an update width ΔV (e.g., 0.05 V).

$$Vth = Vth - \Delta V \quad (2)$$

Furthermore, the target cell-voltage value setting part 80d outputs the updated target lowest-cell-voltage value to the current/voltage command value setting part 80e. The current/voltage command value setting part 80e outputs a current command value and a voltage command value to the DC-DC converter 90 based on the request power output from the request power calculation part 80a, the acceptable cell voltage value output from the acceptable cell-voltage value setting part 80c and the target lowest-cell-voltage value output from the target cell-voltage value setting part 80d. By carrying out such a control, the cell voltage of the fuel cell 20 decreases toward the updated target lowest-cell-voltage value Vth. The above-described control is carried out repeatedly, whereby the target lowest-cell-voltage value Vth is decreased in a stepwise manner.

Operation for Case of Increasing Target Lowest-Cell-Voltage Value

The target cell-voltage value setting part 80d judges whether or not the lowest cell voltage is not near the target lowest-cell-voltage value Vth and is higher than the target lowest-cell-voltage value Vth continuously for a given time period (predetermined time period) using conditional expression (3). Note that a target-value update margin Vr' (≥0) and a predetermined time period Tr' (≥0) may be set/changed arbitrarily, as with conditional expression (1).

$$Vd > Vth + Vr' \text{ that continues for or more than the predetermined time period } Tr' \quad (3)$$

Vth represents the target lowest-cell-voltage value, Vd represents the lowest cell voltage, and Vr' represents the target-value update margin (update margin).

When the target cell-voltage value setting part 80d determines that conditional expression (3) holds (see β2 shown in FIG. 4), the target cell-voltage value setting part 80d updates the target lowest-cell-voltage value Vth with a value obtained by increasing the target lowest-cell-voltage value Vth only by an update width ΔV' (e.g., 0.05 V).

$$Vth = Vth + \Delta V' \quad (4)$$

The reason the target lowest-cell-voltage value that has been decreased in a stepwise manner is increased again is that, when the difference between the lowest cell voltage and the target lowest-cell-voltage value becomes large, this large difference leads to a rapid decline of the lowest cell voltage toward the target lowest-cell-voltage value, causing the cell voltage to be out of control (i.e., causing the cell voltage to fall significantly below the target lowest-cell-voltage value).

Accordingly, when the lowest cell voltage is not near the target lowest-cell-voltage value Vth and is higher than the target lowest-cell-voltage value Vth continuously for a given time period (predetermined time period), as described above, the target lowest-cell-voltage value Vth is updated with the value obtained by increasing the target lowest-cell-voltage value Vth only by ΔV' (e.g., 0.05 V), and the updated target lowest-cell-voltage value is output to the current/voltage command value setting part 80e.

The current/voltage command value setting part 80e outputs a current command value and a voltage command value to the DC-DC converter 90 based on the request power output from the request power calculation part 80a and the target lowest-cell-voltage values output from the acceptable cell-voltage value setting part 80c and the target cell-voltage value setting part 80d. The above-described control is carried out, thereby preventing a problem in that: the lowest cell voltage and the target lowest-cell-voltage value are very different from each other; and as a result, the cell voltage is out of control, leading to the cell voltage falling significantly below the target lowest-cell-voltage value.

FIG. 5 is a flowchart explaining the current limiting processing above. A sequence of processing operations by the controller 80 will be described below with reference to the flowchart in FIG. 5.

First, the rapid warm-up determination part 80a judges whether or not the stack-related temperature in the start preparation state is below the first threshold temperature (e.g., 0° C.). When the rapid warm-up determination part 80a detects that the stack-related temperature detected by the temperature sensor 32, 36 is below the first threshold temperature, the rapid warm-up determination part 80a determines that a rapid warm-up under a low-efficiency operation should be started, and outputs rapid warm-up start commands to the acceptable cell-voltage value setting part 80c, the target cell-voltage value setting part 80d and the current/voltage command value calculation part 80e (step S10 to step S20).

When the acceptable cell-voltage value setting part 80c receives the rapid warm-up start command, the acceptable cell-voltage value setting part 80c recognizes the operation state of the fuel cell 20 as of the relevant moment, and then sets a acceptable lowest-cell-voltage value Vph in accordance with the operation state by referring to the acceptable value map (step S20). Meanwhile, the target cell-voltage value setting part 80d sets an initial value for a target lowest-cell-voltage value Vth (e.g., −0.05 V) (step S30).

(Step S30; See FIG. 4)

The current/voltage command value calculation part 80e outputs a current command value and a voltage command value to the DC-DC converter 90 so as to decrease the cell voltage of the fuel cell 20 toward the set target lowest-cell-voltage value Vth (here, initial value) (step S40). By carrying out such a control, the cell voltage of the fuel cell 20 decreases toward the target lowest-cell-voltage value Vth.

The target cell-voltage value setting part 80d then compares the lowest cell voltage detected by the cell monitor 101 and the set target lowest-cell-voltage value Vth, thereby judging whether or not the point in time when the target lowest-cell-voltage value is updated has come (step S50). More specifically, the target cell-voltage value setting part 80 judges whether or not the lowest cell voltage is near the target lowest-cell-voltage value Vth continuously for a given time period (whether or not the target lowest-cell-voltage value is decreased) using conditional expression (1) above or judges whether or not the lowest cell voltage is not near the target lowest-cell-voltage value Vth and is higher than the target lowest-cell-voltage value Vth continuously for a given time period (whether or not the target lowest-cell-voltage value is increased) using conditional expression (3) above.

When the target cell-voltage value setting part 80d determines that neither conditional expression (1) nor conditional expression (3) holds, and the point in time when the target lowest-cell-voltage value is updated has not come (step S50; NO), the processing returns to step S40. On the other hand, when any of conditional expressions (1) and (3) above holds, the target cell-voltage value setting part 80d carries out processing for decreasing or increasing the target lowest-cell-voltage value Vth in accordance with the conditional expression that has held.

More specifically, when conditional expression (1) above holds (see β1 shown in FIG. 4), the target cell-voltage value setting part 80d updates the target lowest-cell-voltage value Vth with a value obtained by decreasing the target lowest-cell-voltage value Vth only by the update width ΔV (see expression (2)) in order to decrease the target lowest-cell-voltage value (step S50, through step S60, to step S80).

Meanwhile, when conditional expression (3) above holds (see β2 shown in FIG. 4), the target cell-voltage value setting part 80d updates the target lowest-cell-voltage value Vth with a value obtained by increasing the target lowest-cell-voltage value Vth only by the update width ΔV' (see expression (4)) in order to increase the target lowest-cell-voltage value (step S50, through step S60, to step S70).

The target cell-voltage value setting part 80d updates the target cell-voltage value as described above, and then outputs the updated target cell-voltage value to the current/voltage command value setting part 80e. The current/voltage command value setting part 80e outputs a current command value and a voltage command value to the DC-DC converter 90 based on the request power output from the request power calculation part 80a, the target lowest-cell-voltage value output from the target cell-voltage value setting part 80d, etc. (step S40). The above-described control is carried out, thereby preventing a problem in that: the lowest cell voltage and the target lowest-cell-voltage value are very different from each other; and as a result, the cell voltage is out of control, leading to the cell voltage falling significantly below the target lowest-cell-voltage value.

B. Modifications

The present invention is not intended to be limited to the above embodiment, and can be modified in various ways in applications.

Modification 1

Although the target lowest-cell-voltage value is updated when either conditional expression (1) or conditional expression (3) holds in the above embodiment, in addition to this (or instead of this), the target lowest-cell-voltage value may be updated when conditional expression (5) below holds.

$$Ic=Il \text{ that continues for or more than a reset time period } Ts \text{ during a current limiting} \quad (5)$$

Ic represents a current command value, and Il represents a lower-limit current value.

When the target cell-voltage value setting part 80d determines that conditional expression (5) holds, the target cell-voltage value setting part 80d updates the target lowest-cell-voltage value Vth with the lowest cell voltage Vr as of the present moment, as shown in expression (6) below.

$$Vth=Vr \quad (6)$$

Vr represents a lowest cell voltage Vr as of the present moment.

As described above, when the current command value of the fuel cell 20 is equal to the lower-limit current value (e.g., 10 A) for or more than the reset time period (e.g., 500 ms) during the current limiting, the target cell-voltage value setting part (setting unit) 80d updates the target lowest-cell-voltage value Vth with the lowest cell voltage as of the present moment (actual cell voltage) Vr. The reason for carrying out such a control is that, when the lowest cell voltage does not rise to the target lowest-cell-voltage value even after a current limiting for a given time period, the current command value of the fuel cell 20 remains at the lower-limit current value VI. In order to solve the problem described above, when the current command value of the fuel cell 20 is equal to the lower-limit current value for or more than a given time period (reset time period), the target cell-voltage value setting part 80d updates the target lowest-cell-voltage value Vth with the lowest cell voltage Vr as of the present moment. Note that the lower-limit current value Il and the reset time period Ts may be set/changed arbitrarily.

Modification 2

The target lowest-cell-voltage value may be updated when conditional expressions (1)' and (3)' hold instead of (or in addition to) conditional expressions (1) and (3) above. Note that predetermined numbers of times Nr (≥1) and Nr' (≥1) may be set/changed arbitrarily.

$$|Vth-Vd| \leq Vr \text{ that is detected the predetermined number of times } Nr \text{ or more} \quad (1)'$$

$$Vd > Vth+Vr' \text{ that is detected the predetermined number of times } Nr' \text{ or more} \quad (3)'$$

More specifically, when the target cell-voltage value setting part (setting unit) 80d determines that conditional expression (1)' holds, the target cell-voltage value setting part 80d updates the target lowest-cell-voltage value Vth with a value obtained by decreasing the target lowest-cell-voltage value Vth only by the update width ΔV, as shown in expression (2); whereas when the target cell-voltage value setting part 80d determines that conditional expression (3)' holds, the target cell-voltage value setting part 80d updates the target lowest-cell-voltage value Vth with a value obtained by increasing the target lowest-cell-voltage value Vth only by the update width ΔV, as shown in expression (4). As described above, whether or not the target lowest-cell-voltage value is updated may be judged based not on the time period during which the lowest cell voltage is near the target lowest-cell-voltage value Vth or the time period during which the lowest cell voltage is not near the target lowest-cell-voltage value Vth, but based on the number of times when the lowest cell voltage is near the target lowest-cell-voltage value Vth or the number of times when the lowest cell voltage is not near the target lowest-cell-voltage value Vth.

BRIEF DESCRIPTION OF THE DRAWINGS

FIG. 5 is a flowchart explaining the current limiting processing in the embodiment.

DESCRIPTION OF SYMBOLS

Figure 1:
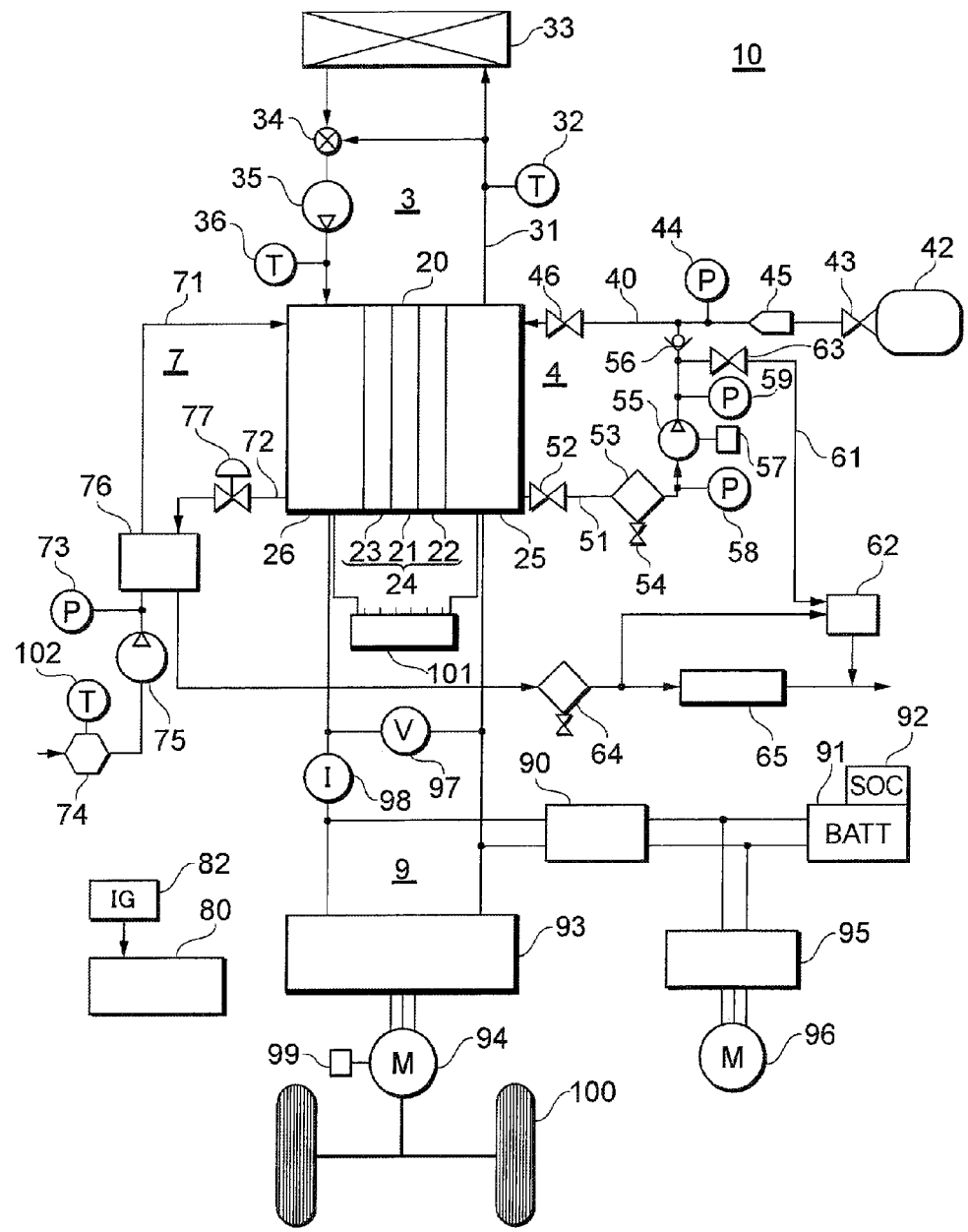
FIG. 1 is a system configuration diagram of a fuel cell system according to an embodiment.
Figure 2:
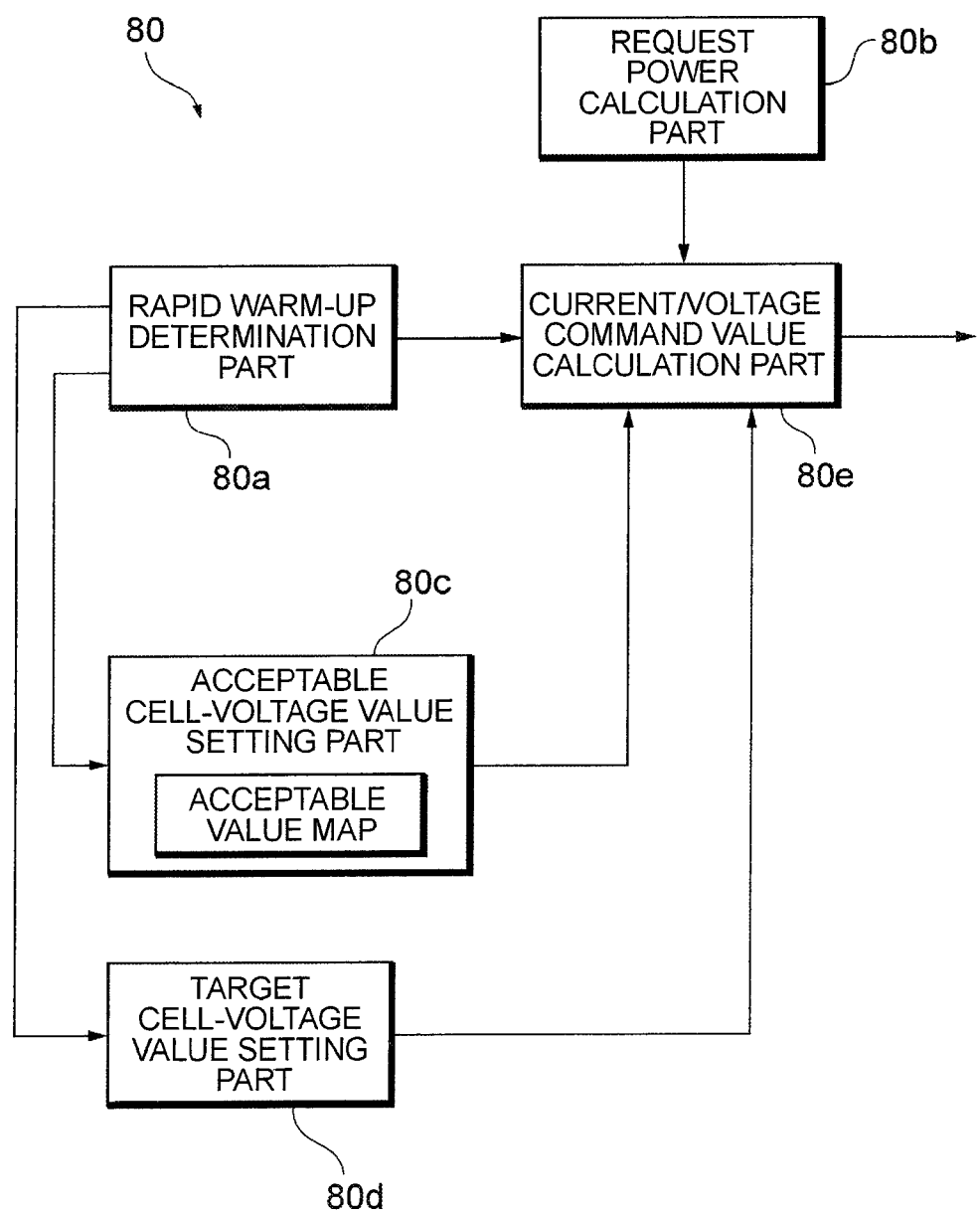
FIG. 2 is a block diagram of a controller according to the embodiment.
Figure 3:
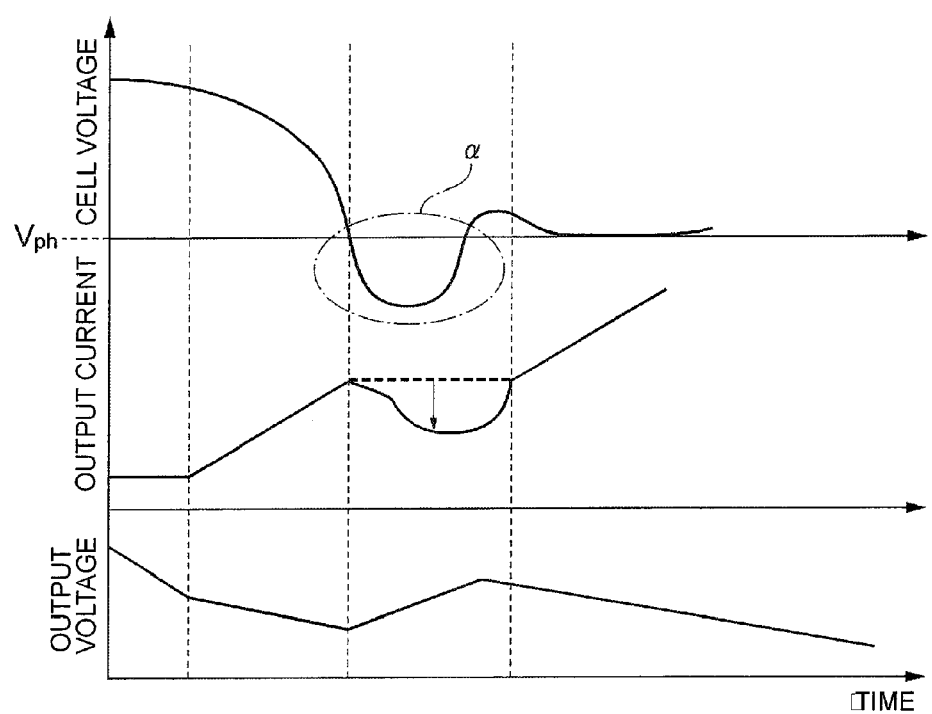
FIG. 3 is a timing chart explaining operations in conventional current limiting processing.
Figure 4:
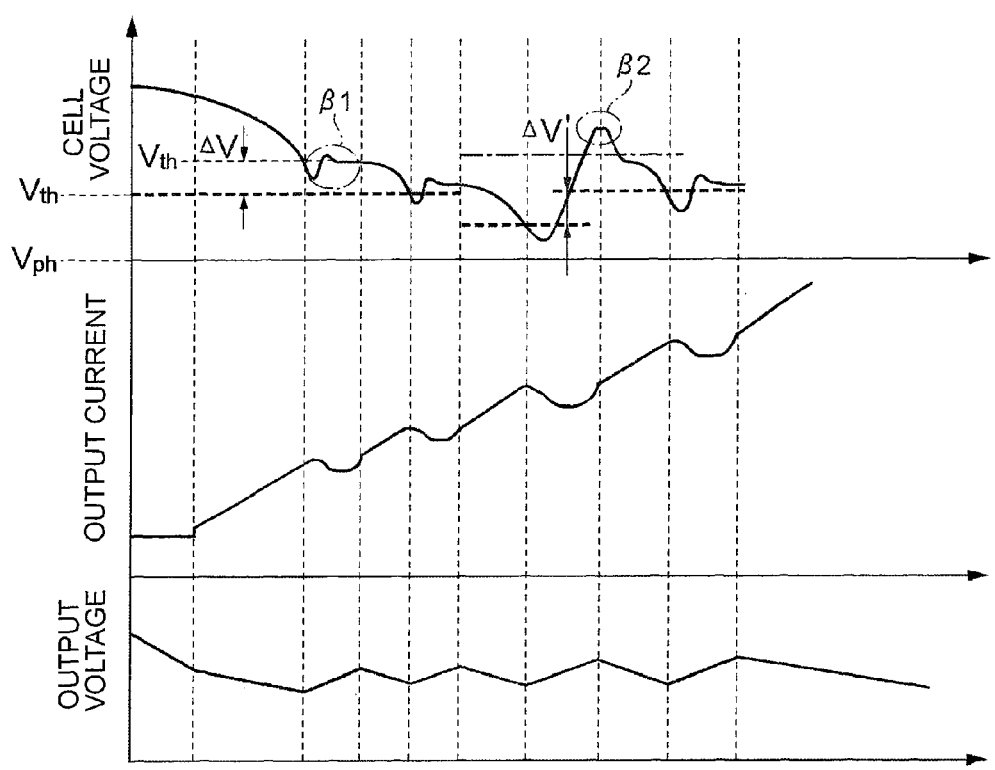
FIG. 4 is a timing chart explaining operations in current limiting processing in the embodiment.

10: fuel cell system, 20: fuel cell, 32, 36: temperature sensors, 101: cell monitor, 80a: rapid warm-up determination part, 80*b*: request power calculation part, 80*c*: acceptable cell-voltage value setting part, 80*d*: target cell-voltage value setting part, 80*e*: current/voltage command value calculation part.

What is claimed is:

1. A fuel cell system comprising:
a fuel cell having a plurality of cells;
a detection unit that detects a cell voltage;
a setting unit that is programmed to set a target lowest voltage for the cell voltage to a value higher than a lowest acceptable value for the cell voltage; and
a control unit programmed to carry out a current limiting for the fuel cell when the detected cell voltage reaches the target lowest voltage, wherein:
when the detected cell voltage falls within a threshold range that indicates being in proximity to the target lowest voltage in a low-efficiency operation that is to operate with a low power generation efficiency so as to increase power generation loss, and this state continues for, or more than, a predetermined time period measured from a moment when the detected cell voltage falls within the threshold range of the target lowest voltage, the setting unit is programmed to decrease the target lowest voltage as of the moment, thereby the setting unit is programmed to update the target lowest voltage in a stepwise manner, and
the control unit that is programmed to carry out the current limiting for the fuel cell when the detected cell voltage reaches the target lowest voltage including when the detected cell voltage is in a state which falls within the threshold range of the target lowest voltage.

2. The fuel cell system according to claim 1, further comprising an acceptable value setting unit programmed to set the lowest acceptable value for the cell voltage based on an operation state of the fuel cell.

3. The fuel cell system according to claim 2, wherein the operation state of the fuel cell indicates any of a related temperature of the fuel cell, an output current of the fuel cell, and a state of supply of a reaction gas with respect to the fuel cell.

\* \* \* \* \*